(12) United States Patent
Oh et al.

(10) Patent No.: US 7,193,836 B2
(45) Date of Patent: Mar. 20, 2007

(54) GROUNDING BRUSH FOR MITIGATING ELECTRICAL CURRENT ON MOTOR SHAFTS

(75) Inventors: Hieyoung W. Oh, Bowdoin, ME (US); Charles A. King, Falmouth, ME (US)

(73) Assignee: Illinois Tool Works Inc, Glenview, IL (US)

( * ) Notice: Subject to any disclaimer, the term of this patent is extended or adjusted under 35 U.S.C. 154(b) by 148 days.

(21) Appl. No.: 10/877,112

(22) Filed: Jun. 25, 2004

(65) Prior Publication Data

US 2004/0233592 A1 Nov. 25, 2004

Related U.S. Application Data

(63) Continuation-in-part of application No. 10/714,295, filed on Nov. 14, 2003.

(60) Provisional application No. 60/508,950, filed on Oct. 6, 2003, provisional application No. 60/508,949, filed on Oct. 6, 2003, provisional application No. 60/455,301, filed on Mar. 17, 2003.

(51) Int. Cl.
*H01H 47/00* (2006.01)
*H05F 3/00* (2006.01)
*H05F 3/02* (2006.01)
*H02H 1/00* (2006.01)
*H02H 1/04* (2006.01)
*H02H 3/22* (2006.01)

(52) U.S. Cl. .................. 361/220; 361/221; 361/222; 361/212

(58) Field of Classification Search .............. 361/220, 361/221, 222, 212

See application file for complete search history.

(56) References Cited

U.S. PATENT DOCUMENTS

| | | | |
|---|---|---|---|
| 4,189,702 A | 2/1980 | Maloy | |
| 4,307,432 A | 12/1981 | Nishikawa | 361/221 |
| 4,515,417 A | 5/1985 | Shiraishi | 384/445 |
| 4,801,270 A | 1/1989 | Scarlata | |
| 5,010,441 A * | 4/1991 | Fox et al. | 361/221 |
| 5,085,373 A | 2/1992 | Behr et al. | |
| 5,090,710 A | 2/1992 | Flower | |
| 5,227,950 A | 7/1993 | Twerdochlib | 361/221 |
| 5,251,081 A | 10/1993 | Cossette et al. | 360/97.02 |
| 5,400,208 A | 3/1995 | Pazda et al. | 361/221 |
| 5,690,014 A | 11/1997 | Larkin | |
| 6,315,475 B1 | 11/2001 | Carter et al. | 400/635 |
| 6,686,673 B1 | 2/2004 | Komura et al. | 310/90 |
| 6,896,735 B2 | 5/2005 | Giuliano et al. | |
| 6,909,868 B2 * | 6/2005 | Yamada et al. | 399/175 |
| 2002/0121821 A1 | 9/2002 | Ritter | |

(Continued)

FOREIGN PATENT DOCUMENTS

EP 0796663 8/2001

*Primary Examiner*—Stephen W. Jackson
*Assistant Examiner*—Dharti H. Patel
(74) *Attorney, Agent, or Firm*—Mark W. Croll; Paul F. Donovan

(57) ABSTRACT

A grounding brush for mitigating static electric charge on a motor shaft includes a plurality of filaments secured to an annular frame around the shaft, with tips of the filaments disposed in a channel defined by the frame. Conductive powder can be provided in the channel to improve current flow from the shaft to the filaments.

22 Claims, 4 Drawing Sheets

U.S. PATENT DOCUMENTS

2003/0030340 A1   2/2003   Tashiro
2004/0135016 A1   7/2004   Baumann et al.
2004/0184215 A1   9/2004   Oh et al.
2004/0233592 A1   11/2004  Oh et al.
2006/0007609 A1   1/2006   Oh et al.

* cited by examiner

GROUNDING BRUSH FOR MITIGATING ELECTRICAL CURRENT ON MOTOR SHAFTS

CROSS-REFERENCE TO RELATED APPLICATIONS

The present application claims the benefits of U.S. Provisional Application Ser. No. 60/508,949, filed Oct. 6, 2003 and U.S. Provisional Application Ser. No. 60/508,950, also filed Oct. 6, 2003; and, further, the present application is a continuation-in-part of co-pending U.S. application Ser. No. 10/714,295, filed on Nov. 14, 2003 which claims the benefit of U.S. Provisional Application Ser. No. 60/455,301, filed on Mar. 17, 2003.

FIELD OF THE INVENTION

The present invention relates to grounding devices for controlling shaft current that is generated in AC motors controlled by variable speed drives or DC motors, and, more specifically, to non-contacting grounding devices.

BACKGROUND OF THE INVENTION

Shaft induced electrical current is experienced in electrical motors, and is commonly experienced with three-phase motors driven by variable speed drives.

Variable speed drives utilize pulse width modulation technology to vary the speed of AC motors, thereby allowing use of less-expensive AC motors in applications where more expensive DC motors had been used previously. A drawback to the use of AC motors with variable speed drives is that higher common mode voltage (CMV) is generated by the variable speed drive that increases shaft induced currents.

Voltage on the motor shaft induces current flow through the shaft bearings to the motor frame and then to ground. While the motor is running, the bearings become more resistive to current flow, causing a buildup of charge on the shaft surfaces. Over a short period of time, the CMV causes electrical charges to build to a high level. As the electrical charges pass the threshold level of the least electrically resistant path, usually through the ball bearings on the shaft, an instantaneous burst or discharge of electrical energy passes through the bearing. This discharge causes electric discharge machining (EDM), which can damage the surfaces of the bearing races and the balls in the bearing. The electrical energy burst creates fusion craters, and particulate from the crater formation remains inside the sealed bearing. Both the fusion crater and the particulate material in the bearing act to disturb the free flow rotation of the bearing, which can lead to physical damage and premature bearing failure.

A number of mitigation technologies have been used in attempts to overcome this problem. Known attempts include using conductive bearing grease, insulating the bearings and using copper/phosphorus brushes and a Faraday shield. A common, somewhat cost-effective solution that has been used is to ground the shaft using spring-loaded copper brushes that provide a continuous flow of current to ground. Copper brushes, however, wear out quite rapidly and require frequent, periodic service and replacement. Additionally, oxide build-up on the shaft and other barriers between the brushes and the shaft reduce the current flow and cause a burst of electrical energy across the brush and shaft. Spring-loaded brushes also tend to vibrate due to alternating frictional stick/slip relationships between the brush and the shaft surface. Vibration of the brushes, from whatever cause, can result in undesirable sparking.

What is needed in the art is a grounding system that can be used effectively for a prolonged period of time, requiring minimal service or replacement.

SUMMARY OF THE INVENTION

The present invention provides a grounding device including conductive filaments in a holder surrounding the shaft. The brush can be used as a non-contacting ionizer to reduce the amount of electrical charges on the isolated shaft or on an isolated roller.

In one aspect thereof, the present invention provides an electric motor with an electrically grounded motor housing, a motor shaft disposed in the housing and rotated during operation of the motor and a static charge dissipating assembly associated with the shaft and the housing. The dissipating assembly includes an annular frame secured around the shaft and electrically connected to the housing. The frame defines an annular channel substantially surrounding the shaft. A plurality of electrically conductive filaments are electrically connected to the annular frame, the filaments being sufficiently small to induce ionization in the presence of an electrical field from static charge on the shaft. The filaments having distal end portions disposed in the channel.

In another aspect thereof, the present invention provides a static charge dissipating assembly for association with a shaft of a motor. The dissipating assembly has an annular frame including first and second frame members defining an annular channel. Electrically conductive filaments are electrically connected to the annular frame and are sufficiently small to induce ionization in the presence of an electrical field. The filaments are retained between the first and second frame members and having distal end portions disposed in the channel.

In a further aspect thereof, the present invention provides an electric motor with an electrically grounded motor housing having a face plate, a motor shaft disposed in the housing and extending through a hole in the faceplate and a static charge dissipating assembly disposed around the shaft and secured within the hole of the faceplate. The dissipating assembly includes an annular frame around the shaft and secured in the hole. First and second frame members define an annular channel substantially surrounding the shaft. Electrically conductive filaments are held between the frame members, and are sufficiently small to induce ionization in the presence of an electrical field from static charges on the shaft. The filaments having distal end portions disposed in the channel.

An advantage of the present invention is providing an effective conductive brush assembly to reduce shaft current on electric motors.

Another advantage of the present invention is providing a grounding device for electric motors that functions effectively for a prolonged period of time without service, maintenance or repair.

Still another advantage of the present invention is providing a conductive brush system having improved conductivity therethrough for improved grounding performance of the device.

A still further advantage of the present invention is providing a grounding device for electric motors that is readily adaptable to motors of different sizes.

Other features and advantages of the invention will become apparent to those skilled in the art upon review of the following detailed description, claims and drawings in which like numerals are used to designate like features.

Figure 1:
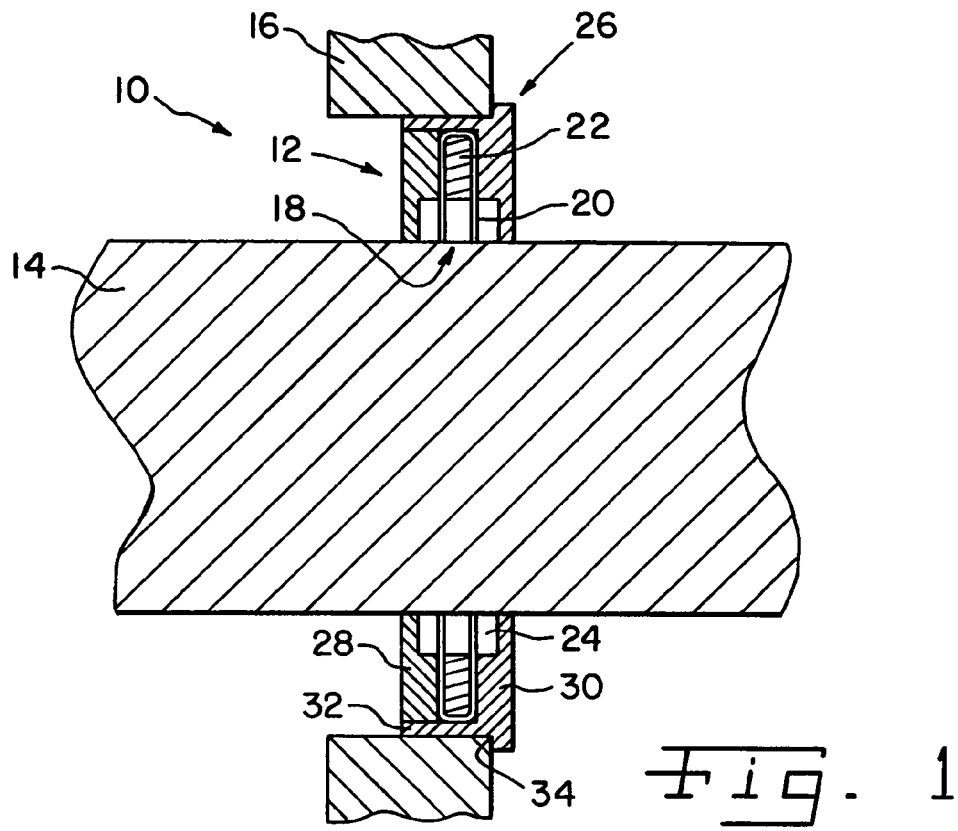
FIG. 1 is a cross-sectional view of a motor shaft and a grounding brush assembly in accordance with the present invention.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Referring now more specifically to the drawings, and to FIG. 1 in particular, numeral 10 designates an electric motor, in fragmentary view, having a shaft charge dissipating assembly 12 in accordance with the present invention operatively associated with a motor shaft 14 of motor 10. Charge dissipating assembly 12 is readily adaptable for use on motors 10 of various sizes, having motor shafts 14 of various diameters.

Charge dissipating assembly 12 is annular in shape, surrounding shaft 14. Charge dissipating assembly 12 is operatively arranged between shaft 14 and a part of a housing of the motor, such as motor faceplate 16. Assembly 12 is continuously operative to dissipate static charges that build on motor shaft 14 during operation of motor 10.

Charge dissipating assembly 12 includes a brush assembly 18 having a plurality of individual fiber filaments 20 that may be arranged individually or in bundles circumferentially around shaft 12. Each filament 20 is a fine, hair-like structure and is made from carbon fibers, stainless steel, conductive plastics such as acrylic or nylon fibers, or any other conductive fiber-type filament that can be provided with diameters sufficiently small to induce ionization when in the presence of an electrical field. Preferably, filaments 20 have diameters within a range of about 5 microns to about 100 microns.

Filaments 20, or bundles thereof, are formed in a u-shape around an annular shaping plate 22 such that opposite distal end portions of filaments 20 extend past the inner diameter of shaping plate 22. Alternatively, individual filaments 20 or bundles of filaments 20 are provided on one or both sides of plate 22 so that only one distal end portion thereof extends past the inner diameter of shaping plate 22. Shaping plate 22 is made of metal, conductive plastic or other conductive material. Filaments 20 or bundles thereof are secured to plate 22 by a layer of conductive adhesive, adhesive tape or other suitable means (not shown). Tape having adhesive on two sides is used between shaping plate 22 and filaments 20 or bundles thereof. Alternatively, filaments 20 are placed directly against the surface of shaping plate 22, with tape applied on the outer surfaces.

The assembly of filaments 20 and shaping plate 22 is held in an annular channel 24 formed in an annular frame 26, including first and second annular frame members 28 and 30 secured to each other and extending generally along opposite sides of brush assembly 18. The confronting faces of first and second frame members 28 and 30 are shaped to receive therebetween shaping plate 22 with filaments 20 thereon, while forming channel 24 in which distal end portions of filaments 20 are positioned. Frame member 30 is made of metal, conductive plastic, or other electrically conductive material, and is connected electrically to brush assembly 18. Frame member 28, which serves as a retention member for holding brush assembly 18 in frame member 30, can be made of material similar to frame member 30, but also can be made of insulating material such as rubber or thermoplastic.

In the embodiment illustrated in FIG. 1, the various components of assembly 12 fit together by interference engagement. Brush assembly 18 is positioned in second frame member 30, and first frame member 28 fits snuggly within an outer flange 32 of second frame member 30, and against brush assembly 18. The pre-assembled dissipating assembly 12 then is secured by pressing flange 32 into an opening in faceplate 16 around shaft 14, with a shoulder 34 of frame 26 engaged against an outer surface of faceplate 16. Other means for securing assembly 12 on motor 10 also can be used, such as, for example, screws (not shown) extending through frame 26 and anchored in faceplate 16. Dissipating assembly thereby is connected electrically to the motor housing through faceplate 16, and thereby is grounded.

Filaments 20 can be in direct contact with shaft 14, as a grounding brush, for direct transfer of electrical charge from shaft 14 to dissipating assembly 12. Filaments 20 also can be minimally spaced from shaft 14 such that, as an electrical field is generated by charges building on shaft 14, an ionized field is created, allowing indirect transfer of charges from shaft 14 to filaments 20. In another suitable arrangement, the fine, lightweight filaments 20 are in contact with shaft 14 when motor 10 is at rest or at slow speeds. As the speed of shaft 14 increases during start up and use, air currents move filaments 20 away from shaft 14. Eliminating or reducing the time period of frictional contact between filaments 20 and shaft 14 reduces wear and prolongs the life of filaments 20. Frame 26 is electrically connected to ground, and charges building on shaft 14 are dissipated to ground through dissipating device 12 before arcing can occur.

Those skilled in the art will understand readily that a variety of different configurations are suitable with respect to the frame and frame members for holding brush assembly 18 around shaft 14 and secured to motor face plate 16.

Figure 2:
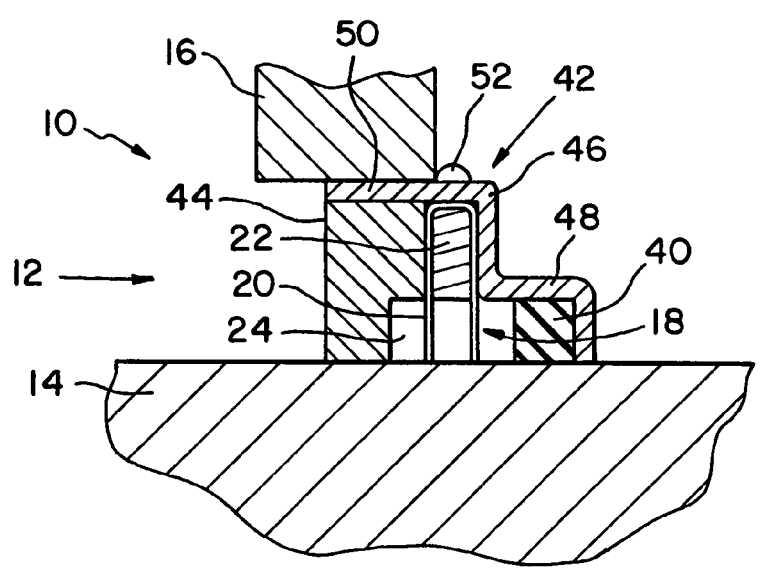
FIG. 2 is a fragmentary cross-sectional view similar to that of FIG. 1, but illustrating a second embodiment of the present invention.

Shaft charge dissipating assemblies of the present invention can be incorporated with other functional elements of motor 10. FIG. 2 illustrates an embodiment of the present invention in which a bearing insulating seal 40 is held on shaft 14 by a frame 42. Frame 42 may include a first flame member 44 similar to flame member 28 and a modified second frame member 46 having an extended portion 48 forming a pocket for holding seal 40. Brush assembly 18 and seal 40 are positioned in frame 42, and the entire assembly is then press-fit into faceplate 16. Instead of a shoulder, an outer flange 50 of flame member 46 is provided with one or more dimples 52 or other surface projections for engaging the outer surface of faceplate 15.

Figure 3:
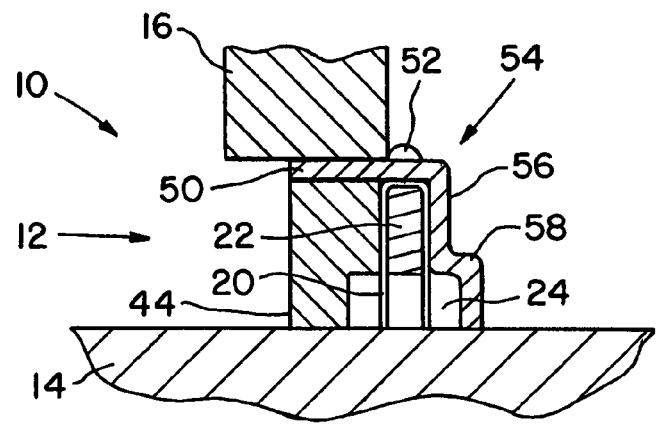
FIG. 3 is a cross-sectional view similar to FIG. 2, but illustrating a third embodiment of the present invention.

FIG. 3 illustrates a further embodiment of the present invention, in which a flame 54 has a flame member 56, including an extended portion 58 without a bearing seal therein. Extended portion 58 provides ample space around filaments 20 for effective ionization, yet member 58 is formed easily by metal stamping processes.

Figure 4:
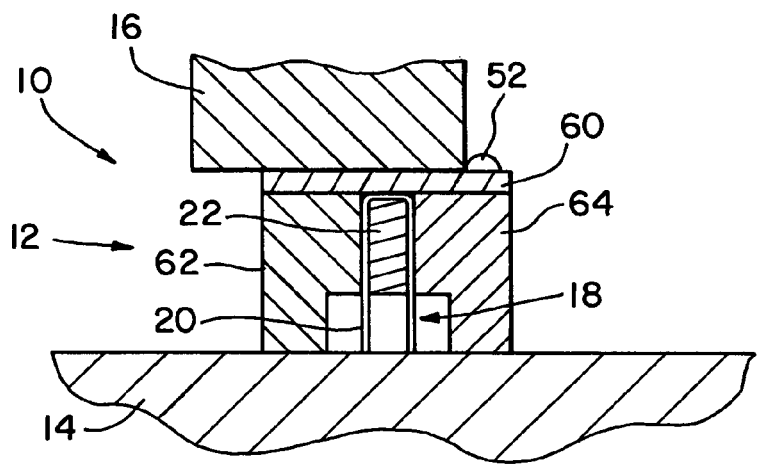
FIG. 4 is a cross-sectional view illustrating a fourth embodiment of the present invention.

FIG. 4 shows an advantageous construction of the present invention for easy manufacture. A metal or conductive plastic outer ring 60 is provided of a size to be secured within motor faceplate 16 by interference fit. Symmetrical thermoplastic or rubber retention rings 62 and 64 are provided in two pieces to be held by interference fit within ring 60. Brush assembly 18 is held between symmetrical retention rings 62 and 64 within outer ring 60.

To improve the performance of dissipating assemblies in accordance with the present invention, fine conductive powder 70 is provided in annular channel 24, around the distal portions of filaments 20. Powders such as carbon powder or other metallic powders are used. Particles 70 can be used dry. However, if particles 70 are mixed with silicone oils of various types, synthetic hydrocarbon oil, ester oil, fluorine oil, ether oil, polyglycol oil, mineral oil or the like the paste-like substance resulting therefrom is more easily held around the distal tips of filaments 20.

Figure 5:
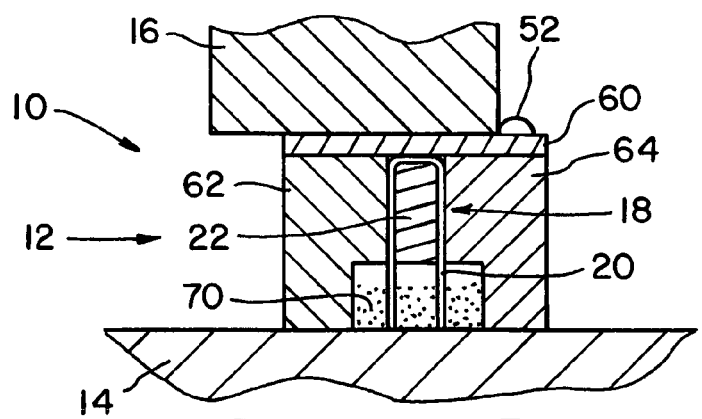
FIG. 5 is a cross-sectional view illustrating a fifth embodiment of the present invention.

FIG. 5 illustrates an embodiment similar to FIG. 4, but having particles 70 around filaments 20 between symmetrical members 62 and 64. It has been found that filaments 20 of about 100 micron size with conductive particles 70 having diameters of less than about 50 microns work effectively. Rings 62 and 64 have an inner diameter so as to be minimally spaced from shaft 14. Thus, rings 62 and 64 do not ride against shaft 14 and friction does not occur. However, the distance between shaft 14 and rings 62 and 64 is sufficiently small that grease from bearings and the like on the inner side of shaft 14, and dirt or other contaminants from the outer end of shaft 14, do not migrate easily beyond rings 62 and 64. Filaments 20 are thus protected from contamination.

When conductive powder 70 is used, current flow from motor shaft 14 to filaments 20 can occur by two different mechanisms. The first mechanism is air ionization around the filament tips. The other mechanism is through physical contact of powder 70 against shaft 14, the various particles of powder 70 contacting each other and also particles 70 contacting filaments 20. As the motor shaft rotates, filaments 20 are lifted off the shaft surface by airflow. However, even if wear occurs on the filaments over time, such that contact does not occur even when shaft 14 is at rest, the present device will continue to operate not only by ionization, but also by current flow through the conductive powder 70.

Motor shafts are not perfectly round. As the shaft rotates, a distance from distal tips of filaments 20 to the shaft surface can vary and may be too high to effectively ionize air surrounding filaments 20. When fine conductive powders 70 are provided in the gaps between the surface of shaft 14 and the distal tips of filaments 20, the conductive powder compensates for the gap distance variations by filling the gap. Therefore, the conductive powder creates a situation wherein the filament tips maintain a sufficiently close proximity to charged surfaces to provide continuous air ionization. Further, particle movement occurs due to the electrical attraction toward the ground points at the filament tips. This particle movement also increases the electron transport from the rotating shaft to the filament tips.

Figure 6:
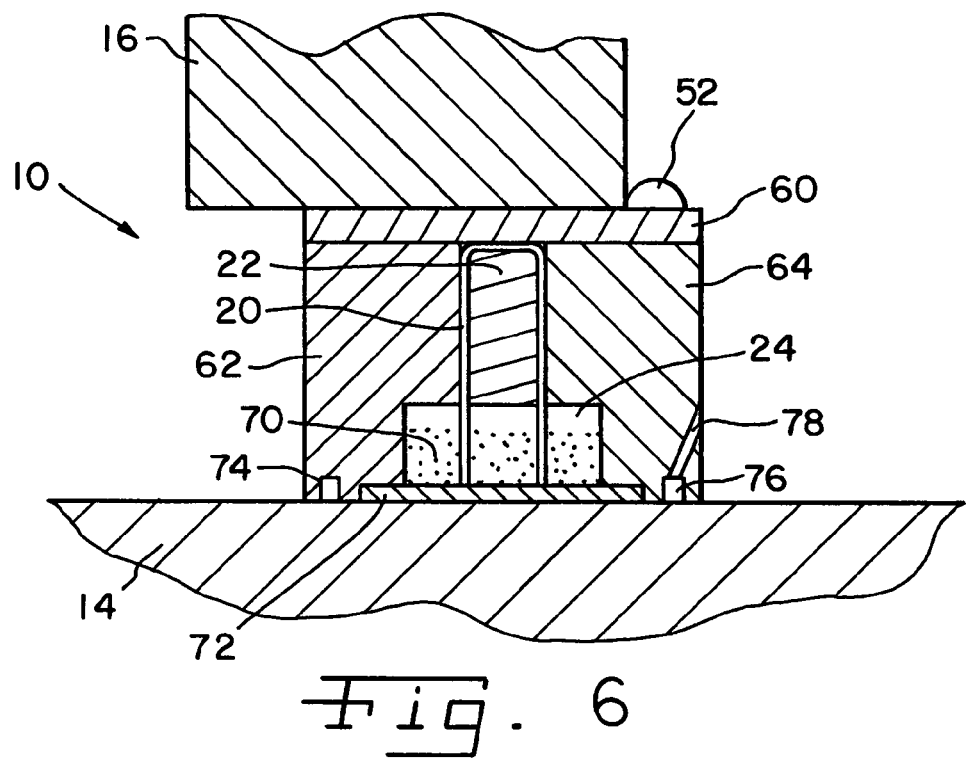
FIG. 6 is a cross-sectional view illustrating a sixth embodiment of the present invention.

FIG. 6 illustrates a further embodiment of the present invention which is similar to that shown in FIG. 5. In addition to the similar structure of FIG. 5, the embodiment of FIG. 6 includes a thin inner ring 72 between filaments 20 and shaft 14. Inner ring 72 is provided to more effectively contain conductive powder 70 within channel 24. To more effectively prevent contaminants from reaching the channel around filaments 20, annular recesses 74 and 76 are provided on the inner faces of retention rings 62 and 64, respectively. One or more drain hole 78 is provided in each ring 62, 64, one such drain hole 78 being shown in ring 64. Contaminants between shaft 14 and retention rings 62 and 64 are caught in channels 74 and 76, and are removed through drain holes 78 by centrifugal force.

Figure 7:
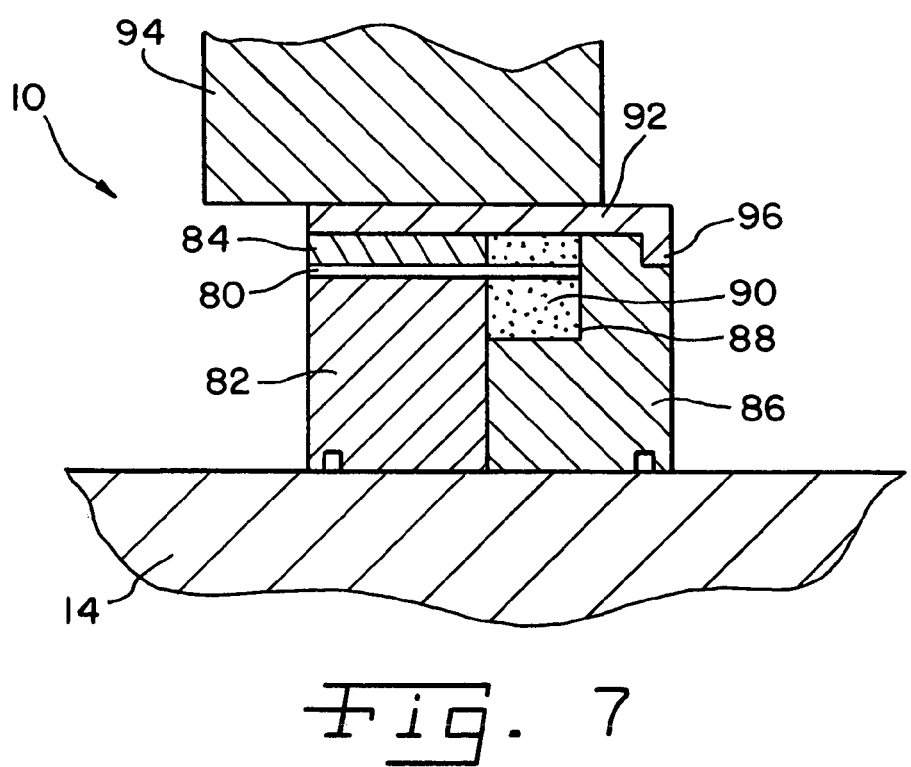
FIG. 7 is a cross-sectional view illustrating a seventh embodiment of the present invention.

FIG. 7 illustrates yet another embodiment of the present invention, which is arranged parallel to the motor shaft axis. Instead of being arranged with their distal tips confronting shaft 14, filaments 80 of this embodiment are generally parallel to the axis of shaft 14, and are positioned individually or in bundles around stator 82. Filaments 80 are held against stator 82 by a retention ring 84. A rotor 86 rotates with shaft 14. Stator 82 and rotor 86 are in confronting relationship, and filaments 80 extend beyond stator 82 and into a channel 88 defined in the face of rotor 86 that confronts stator 82. Conductive powder 90 is provided in channel 88, around distal tips of filaments 80. Rotor 86 and stator 82 are assembled into a shell 92, which is press-fit into grounded motor housing 94. A lip 96 of shell 92 overlaps rotor 86.

Figure 8:
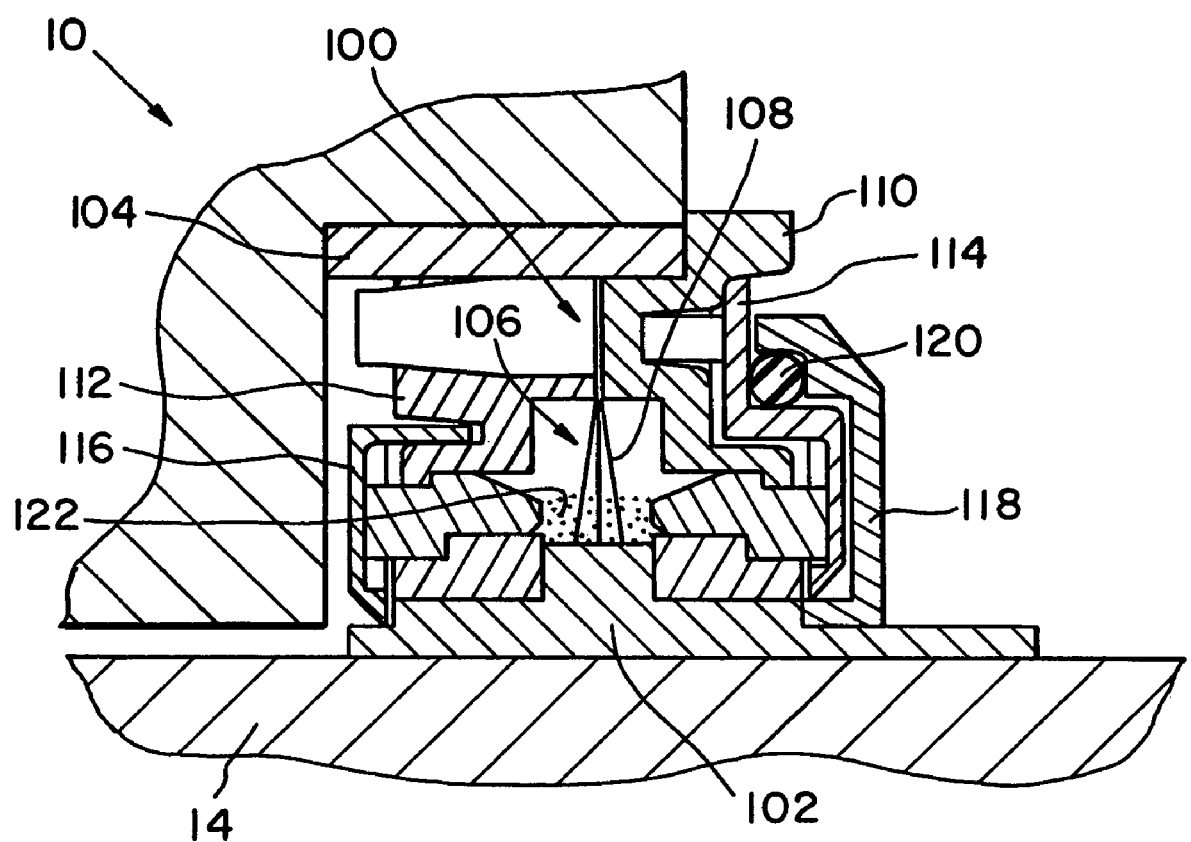
FIG. 8 is a cross-sectional view illustrating an eighth embodiment of the present invention.

A still further embodiment of the present invention is shown in FIG. 8. Charge dissipating assembly 100 is positioned between rotor 102, turning with shaft 14, and stator ring 104 radially outward thereof. Pluralities of filament bundles 106, including pluralities of individual filaments 108, are held in an assembly frame, between a male frame plate 110 and a female frame plate 112. Front and back seal plates 114 and 116, respectively, are provided. A slinger 18 and o-ring 120 are provided outwardly of front seal plate 114. Conductive powder 122 is sealed in a channel 124 defined by male plate 110 and female plate 112. Conductive tape or a thin conductive ring can be used between stator ring 104 and male plate 110 to enhance conductivity through assembly 100. As illustrated in FIG. 8, all components of this embodiment are configured for interference or snap-fit engagement, and ease of assembly is enhanced thereby.

Dissipating devices in accordance with the present invention can be used as a slip ring to convey electrical signal of power. Devices in accordance with the present invention can also be used as bearing isolators to protect bearings of motors or other rotating equipment. Dissipaters of the present invention work as contacting grounding brushes and also as non-contacting ionizing devices. Thus, even as wear occurs, dissipating assemblies in accordance with the present invention continue to operate effectively.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. An electric motor comprising:
   an electrically grounded motor housing;
   a motor shaft disposed in said housing and rotated during operation of said motor; and
   a static charge dissipating assembly associated with said shaft and said housing, said dissipating assembly including:
   an annular flame secured in stationary relationship around said shaft so as to not rotate therewith and electrically connected to said housing, said frame defining an annular channel substantially surrounding said shaft; and
   a plurality of electrically conductive filaments electrically connected to said annular flume, said filaments being sufficiently small to induce ionization in the presence of an electrical field from static charges on said shaft, said filaments having distal end portions disposed in said annular channel.

2. The motor of claim 1, said dissipating assembly including an annular plate, and said filaments partially wrapping said plate, with opposite distal end portions of said filaments extending into said annular channel.

3. The motor of claim 1, including electrically conductive powder disposed in said annular channel.

4. The motor of claim 3, said electrically conductive powder being mixed with an oil to form a paste.

5. The motor of claim 3, said dissipating assembly including an annular plate, and said filaments partially wrapping said plate, with opposite distal end portions of said filaments extending into said annular channel.

6. The motor of claim 5, said filaments being of sufficient length that ends of said filaments contact said shaft, at least when said shaft is at rest.

7. The motor of claim 5, said frame including an outer ring and first and second retention rings disposed in said outer ring on opposite sides of said plate and said filaments.

8. The motor of claim 7, said frame further including an inner ring covering said annular channel.

9. The motor of claim 7, said first and second retention rings each having an annular recess facing said shaft, and drain holes for evacuating contaminants from said recess.

10. The motor of claim 1 having a rotor rotating with said shaft, and said filaments arranged substantially parallel to said shaft, with distal ends of said filaments confronting said rotor.

11. The motor of claim 1, said filaments being of sufficient length that ends of said filaments contact said shaft, at least when said shaft is at rest.

12. The motor of claim 1, said filaments arranged in bundles.

13. The motor of claim 1, said annular frame including first and second frame members, one said flume member being secured within the other said frame member.

14. The motor of claim 1, said frame including an outer ring and first and second retention rings disposed within said outer ring on opposite sides of said filaments.

15. A static charge dissipating assembly for association with a shaft of a motor, said dissipating assembly comprising:
   an annular frame, said frame including first and second frame members defining an annular channel;
   a plurality of electrically conductive filaments electrically connected to said annular frame, said filaments being sufficiently small to induce ionization in the presence of an electrical field, said filaments being retained between said first and second frame members and having distal end portions disposed in said channel; and
   an annular plate, and said filaments partially wrapping said annular plate, with opposite distal end portions of said filaments extending into said annular channel.

16. A static charge dissipating assembly for association with a shaft of a motor, said dissipating assembly comprising;
   an annular frame, said frame including first and second frame members defining an annular channel;
   a plurality of electrically conductive filaments electrically connected to said annular flume, said filaments being sufficiently small to induce ionization in the presence of an electrical field, said filaments being retained between said first and second frame members and having distal end portions disposed in said annular channel; and
   an electrically conductive powder disposed in said annular channel.

17. The dissipating assembly of claim 16, said electrically conductive powder being mixed with an oil to form a paste.

18. A static charge dissipating assembly for association with a shaft of a motor, said static charge dissipating assembly comprising:
   an annular frame, said frame including first and second frame members defining an annular channel;
   a plurality of electrically conductive filaments electrically connected to said annular frame, said filaments being sufficiently small to induce ionization in the presence of an electrical field, said filaments being retained between said first and second frame members ad having distal end portions disposed in said annular channel;
   said annular frame including an outer ring and first ad second retention rings disposed in said outer ring on opposite sides of said filaments.

19. The dissipating assembly of claim 18, including conductive powder disposed in said channel.

20. The dissipating assembly of claim 19, said frame further including an inner ring covering said annular channel.

21. An electric motor comprising:
   an electrically grounded motor housing having a face plate;
   a motor shaft disposed in said housing and extending through a hole in said faceplate; and
   a static charge dissipating assembly disposed around said shaft and secured within said hole of said faceplate, said dissipating assembly including:
   an annular frame fixed in a non-rotation position around said shaft so as to not rotate therewith and secured in said hole, said annular frame including first and second frame members defining an annular channel substantially surrounding said shaft; and
   a plurality of electrically conductive filaments held between said frame members, said filaments being sufficiently small to induce ionization in the presence of an electrical field from static charges on said shaft, said filaments having distal end portions disposed in said annular channel.

22. The electric motor of claim 21, including conductive powder disposed in said channel.

* * * * *